United States Patent [19]

Chang et al.

[11] 3,986,526
[45] Oct. 19, 1976

[54] HYBRID FLUIDIC AND FLUID SERVO CONTROLLER

[75] Inventors: Robert C. C. Chang, Sao Paulo, Brazil; William M. Scott, Newtown Square, Pa.

[73] Assignee: Sun Oil Company of Pennsylvania, Philadelphia, Pa.

[22] Filed: June 14, 1974

[21] Appl. No.: 479,689

[52] U.S. Cl. .............................. 137/804; 137/85; 137/486; 91/384
[51] Int. Cl.² ............... G05B 11/44; G05D 16/00
[58] Field of Search ............... 137/85, 86, 82, 84, 137/487.5, 98, 100, 804, 805, 486; 91/384, 388; 222/59, 63; 128/214; 251/58, 61

[56] References Cited
UNITED STATES PATENTS

| | | | |
|---|---|---|---|
| 1,772,403 | 8/1930 | Smoot | 91/384 X |
| 2,622,866 | 12/1952 | Johnsen | 91/384 X |
| 2,658,484 | 11/1953 | Kenney | 91/384 X |
| 2,659,349 | 11/1953 | Starkey | 91/384 X |
| 2,931,375 | 4/1960 | Lewis | 91/384 X |
| 3,113,582 | 12/1963 | Hudson | 137/85 X |
| 3,174,504 | 3/1965 | Rosenbrock eet al. | 137/486 |
| 3,460,554 | 8/1969 | Johnson | 137/804 X |
| 3,463,176 | 8/1969 | Lazar | 137/805 X |
| 3,613,369 | 10/1971 | Colston | 137/805 X |
| 3,699,989 | 10/1972 | O'Connor | 137/487.5 |
| 3,800,794 | 4/1974 | Georgi | 137/487.5 |
| 3,856,486 | 12/1974 | Chang | 137/85 X |

Primary Examiner—Martin P. Schwadron
Assistant Examiner—Robert J. Miller
Attorney, Agent, or Firm—J. Edward Hess; Donald R. Johnson; Gary V. Pack

[57] ABSTRACT

A train of fluid pulses representative of a process variable is processed by digital fluidic circuits and is then converted into an analog fluid pressure signal which is compared to an analog command signal, the difference between the two compared signals being caused to appear in the form of a displacement. This displacement is amplified by means of a fluid servo system, the amplified output of which is utilized for directly driving a control element for a process.

6 Claims, 4 Drawing Figures

HYBRID FLUIDIC AND FLUID SERVO CONTROLLER

This invention relates to a controller, and more particularly to a controller for automatic control of a process variable.

There are many situations in the process industries wherein it may be desired to automatically maintain a process variable at a value corresponding to a setpoint, or at a value established by a so-called command signal. By way of example only, two such situations will now be referred to briefly.

1. The temperature of a process stream may be detected, the result being compared with a setpoint to develop an error signal which is utilized to directly drive a control valve for the stream.

2. The rotational speed of a prime mover (such as a stream turbine) may be detected, the result being compared with a setpoint to develop an error signal which is utilized to directly drive the throttling valve of the turbine.

For automatic control of process variables in situations such as those referred to in the preceding paragraph, pneumatic control systems (or controllers) are ordinarily used. These systems are generally based on the force balanced feedback principle. This principle is usually implemented by mechanical means (e.g., a detector) operating to transduce the process variable to a force or torque, which is then measured and amplified, in terms of pneumatic signals, through a force balanced flapper nozzle and pneumatic relay feedback system. Systems of this type usually require a direct mechanical interface with the process variable. This direct mechanical interface, coupled with the mechanical linkages required for the balancing of the input and the feedback forces of the force balanced feedback system, imposes a substantial limitation on applications of the system, as well as on the speed of response of the system.

An object of this invention is to provide a novel control system for controlling a process variable.

Another object is to provide a control system (for controlling a process variable) which has greater reliability and an improved response time, as compared to a conventional pneumatic control system.

A further object is to provide a control system for a process variable which utilizes fluidic elements throughout.

A still further object is to provide a control system for a process variable which does not require a direct mechanical interface with such variable, in the detector (transducer).

Yet another object is to provide a transducer (usable as a process variable detector) which employs a noncontacting type of detecting means.

Still another object is to provide a servo system, for a process variable controller, which provides a simpler and more direct means of power amplification than a force balanced feedback system as conventionally employed.

The objects of this invention are accomplished, briefly, in the following manner: Fluid pulse train signals representative of a process variable to be controlled are generated by a detector. These signals are processed by fluidic digital circuits and then are converted into an analog fluid pressure signal; this analog signal is compared to an analog command signal (which serves as a setpoint) and the difference, which appears in the form of displacement, is amplified by a fluid servo system, the output of which is utilized for directly driving a final control element for the process.

A detailed description of the invention follows, taken in conjunction with the accompanying drawings, wherein.

Figure 1:
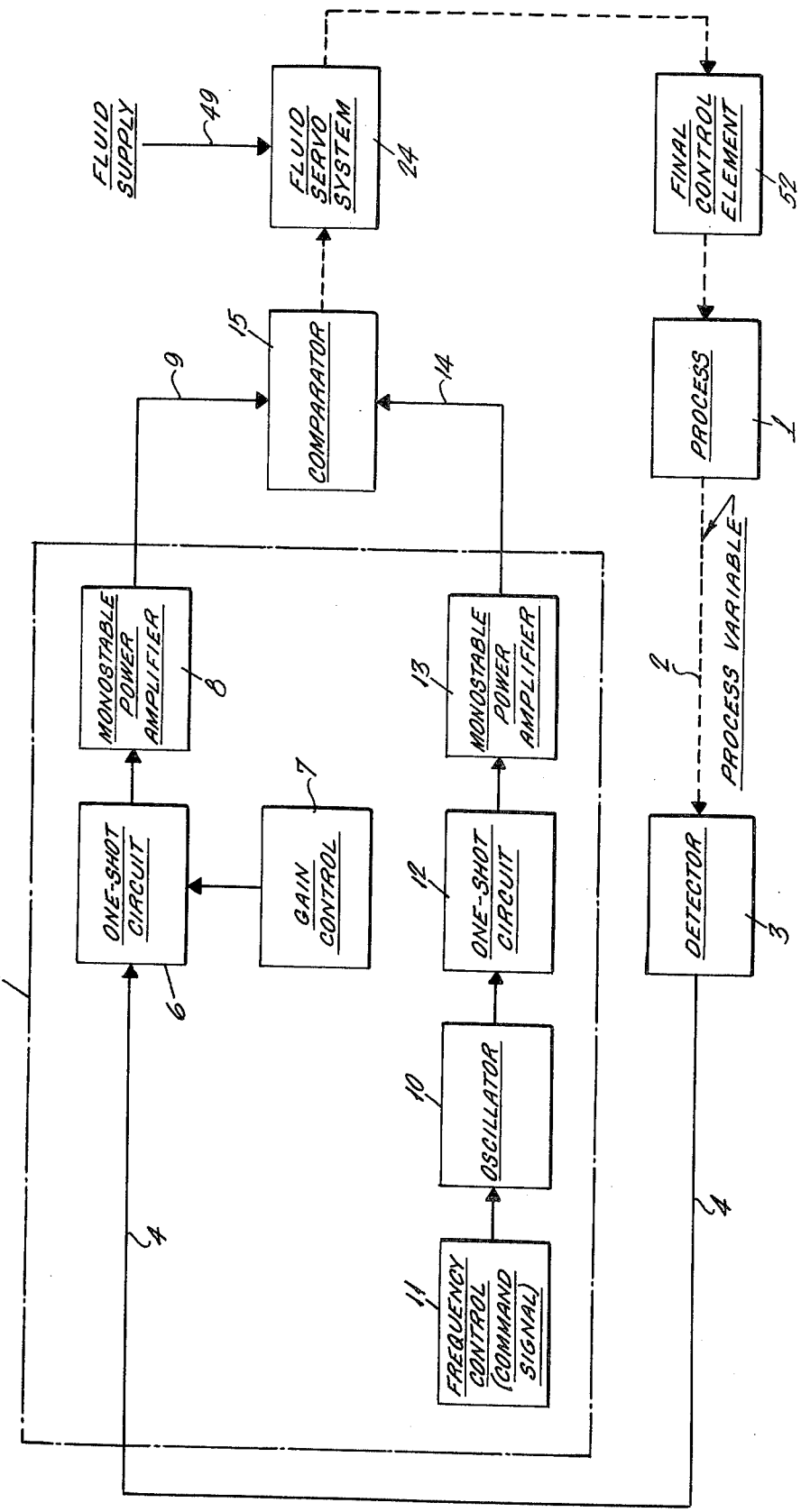
FIG. 1 is a block diagram of a controller according to this invention.

Referring now to FIG. 1, the block denoted by numeral 1 represents a process. In the coupling 2 which is indicated by dotted lines and which is essentially a part of the process, there appears the process variable which is to be controlled by the controller of this invention. This process variable is fed to the input side of a detector 3.

In many cases, with the advent of fluid technology it becomes possible to transduce a process variable into a train of fluid pulses whose frequency is either directly proportional to, or has a well-defined relationship to (i.e., is representative of) the process variable. A process variable can be transduced to a fluid pulse train by noncontacting means. For example, temperature can be detected by a fluidic oscillator whose frequency varies with the temperature being monitored. Again, the detector can function to produce fluid pulse signals whose frequency is representative of the rotational speed of a prime mover; these fluid pulse signals could be generated by an interruptible fluid jet, or a back pressure fluid valve, which is magnetically actuated by a rotating magnetic field made synchronous with the rotating shaft of the prime mover.

The detector 3 may be of either of the two types described in the preceding paragraph. Or, it may be of some other type which operates in similar fashion. In any event, the detector 3 converts the process variable (on coupling 2) into a train of process fluid pulses (which appear at the detector output 4) whose frequency is either directly proportional to, or has a well-defined relationship to (i.e., is representative of) such process variable.

The detector output signal (train of process fluid pulses) in the fluid coupling 4 is fed into the digital fluidic circuitry included in the block 5, for processing therein. More particularly, the raw detector output signal is passed through a (fluidic) one-shot circuit 6, which controls the width of the pulses in the detector pulse train. Gain control can be implemented at this point, as indicated at 7, by adjusting the pulse width of the detector (process variable) signal. The treated or processed detector signal (to wit, the output of circuit 6) is amplified by means of a fluidic monostable power amplifier 8; the amplified output appears on one fluidic output coupling 9 of the circuits 5.

The command signal (which is compared to the detector signal, and which in effect establishes a setpoint for the controller) is also a fluid pulse train which is generated by a fluidic oscillator 10. The frequency of the oscillator 10 is variable by means of the frequency control means 11 (used to adjust the controller setpoint).

The command signal (also a train of fluid pulses, output of oscillator 10) is passed through a (fluidic) one-shot circuit 12, which controls the width of the pulses in the command signal pulse train. The treated or processed command signal (to wit, the output of circuit 12) is amplified by means of a fluidic monostable power amplifier 13; the amplified output appears on the other fluidic output coupling 14 of the circuits 5.

The signals appearing on output couplings 9 and 14 are fed respectively to the two inputs of a comparator 15, which latter functions to convert each of these signals to a respective analog fluid pressure signal, to compare the two analog signals, and to provide a displacement representative of the difference between the two compared signals.

Figure 2:
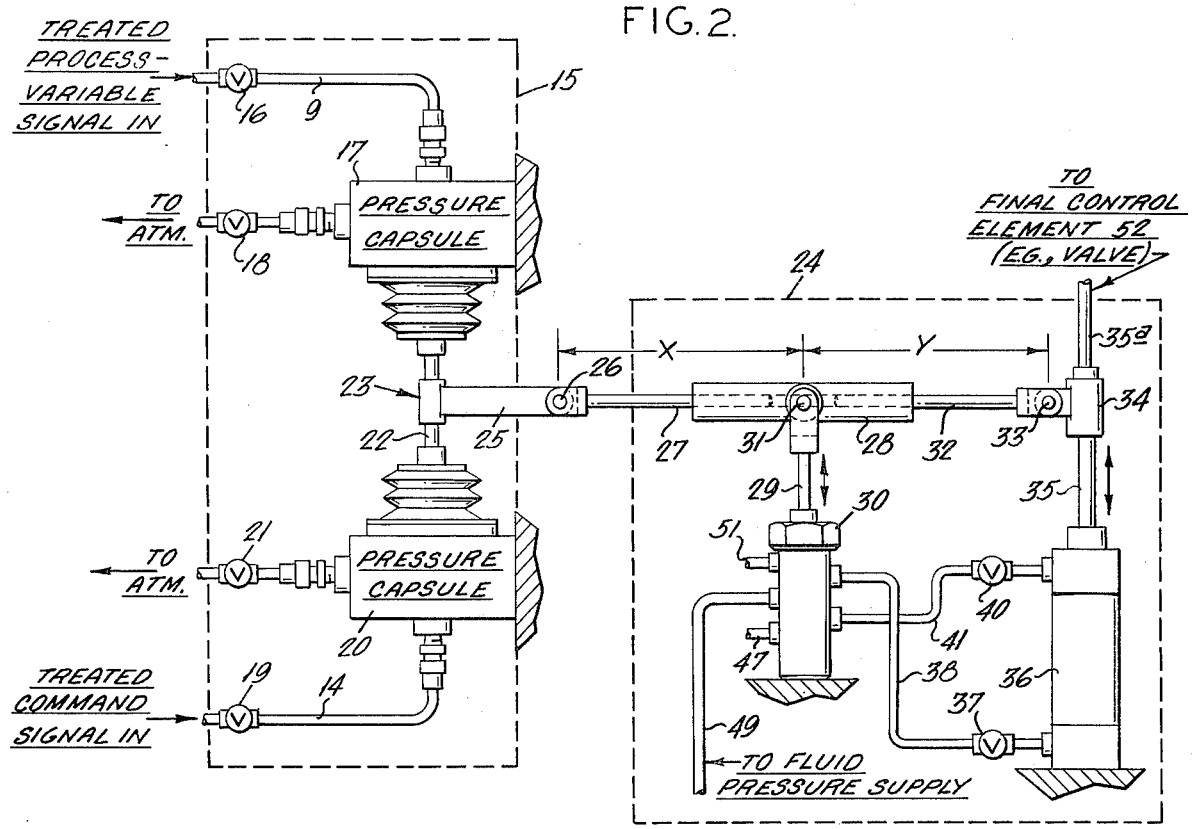
FIG. 2 is a schematic of a portion of the FIG. 1 controller.

Refer now to FIG. 2. The amplified signal in output line 9 (illustrated as a pipe) is fed through a flow control valve 16 to a first pressure capsule 17, which may be simply a chamber having a flexible wall and also having (in addition to the pipe from valve 16) another pipe leading through a control valve 18 to the atmosphere, the latter operating as a controlled leak to atmosphere from the chamber. The pressure capsule 17 serves as a time averaging means, which converts the process-variable-signal (fluid pulse train), after being processed by the digital fluidic circuitry 5, to an analog fluid pressure signal the pressure of which has a well-defined relationship to the process-variable pulse frequency or repetition rate.

The amplified signal in output line 14 (illustrated as a pipe) is fed through a flow control valve 19 to a second pressure capsule 20, which is quite similar to capsule 17 and which has a controlled-leak-pipe leading through a control valve 21 to the atmosphere. The pressure capsule 20 serves as a time averaging means, which converts the command signal (fluid pulse train), after being processed by the digital fluidic circuitry 5, to an analog fluid pressure signal the pressure of which has a well-defined relationship to the command-signal pulse frequency or repetition rate.

The pressures in the process-variable-signal capsule 17 and the command-signal capsule 20 are made to oppose each other, for example by attaching independent pistons responsive respectively to such pressures to opposite ends of the head portion 22 of a T-shaped rod assembly 23; thus, the difference of the pressures in the capsules 17 and 20 drives the piston-and-rod assembly 23. Consequently, the rod 22 will continue to move in one direction or the other (upwardly or downwardly in FIG. 2) unless the pressures in the capsules are equal, at which time the values of the process-variable-signal and the command signal are equal to each other. To state the above in another way, in the comparator 15 the analog fluid pressure detector signal is compared to the analog fluid pressure command signal, the difference therebetween appearing in the form of displacement (of rod 22).

A fluid servo system 24, coupled to the displacement output of the comparator 15, amplifies the same in terms of power and/or displacement. The comparator displacement output appears at the assembly 23.

The leg portion 25 of the T-rod 23 is pivotally connected at 26 to one end of a link member 27 whose other end is slidably mounted in one end of a sleeve 28. The stem 29 of a four-way valve 30 (whose construction is detailed in FIG. 3, later described) is pivotally connected at 31 to the central portion of sleeve 28. One end of a link member 32 is slidably mounted in the other end of sleeve 28 (opposite to link 27), and the other end of link member 32 is pivotally connected at 33 to a T-shaped fitting 34 which is secured to the rod 35 of a double-acting cyclinder 36 (a power cylinder).

The power cylinder lower port is connected through a flow control valve 37 and a pipe 38 to one "work" port 39 of the four-way valve 30. The power cylinder upper port is connected through a flow control valve 40 and a pipe 41 to the other "work" port 24 of the four-way valve. The valve 30 includes three spaced, aligned pistons 43, 44, and 45 slidably mounted within a multi-port cylinder, these pistons being operated (slid) by means of the stem 29, to which they are attached.

Opposite ports 39 and 42, the valve cylinder 30 has three spaced "operating" ports. The lower port 46 is connected by way of pipe 47 to exhaust (e.g., atmosphere). The central port 48 is connected by way of pipe 49 to a high-pressure fluid supply. The upper port 50 is connected by way of pipe 51 to exhaust (atmosphere).

Figure 3:
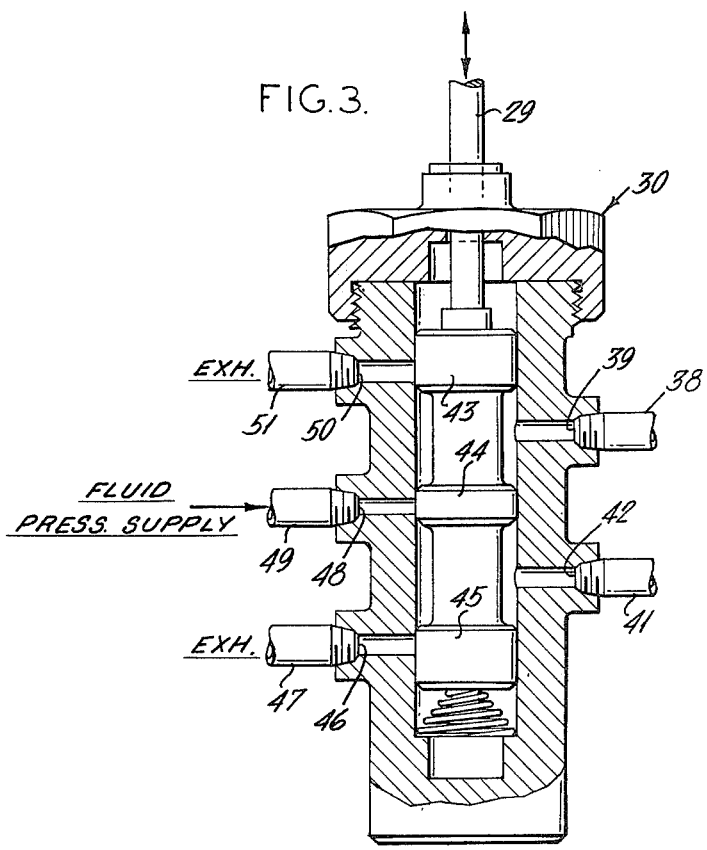
FIG. 3 is a sectional view of a four-way valve, illustrating the construction thereof.

In FIG. 3, the four-way valve is illustrated in its equilibrium position. In this position, all of the "operating" ports 46, 48, and 50 are closed off by the pistons 45, 44 and 43, respectively. If stem 29 moves upwardly from this position, pipe 38 is connected to exhaust by way of pipe 51, and pipe 41 is connected to the fluid pressure supply pipe 49. If stem 29 moves downwardly from the FIG. 3 position, pipe 38 is connected to the fluid pressure supply pipe 49, and pipe 41 is connected to exhaust by way of pipe 47.

At the equilibrium position of FIG. 3, the ports 39 and 42 to both sides of the power cylinder 36 are closed off from the fluid pressure supply and exhaust lines; therefore, the piston rod 35 should maintain its position indefinitely. If however, there should be a change in load which affects the process varible, or a change in the command signal, there will be a difference in pressure between the comparator capsules 17 and 20, which will drive the comparator rod 22 toward the capsule in which the pressure is less than in the other.

For example, let us assume that the pressure in the command signal capsule 20 is increased. Then, the comparator rod 22 will be moved upward; by virtue of the pivots and the sliding linkages the four-way valve stem 29 will also be moved upward, opening the upper port of the power cylinder 36 to the fluid supply pressure and the lower port of the same cylinder to exhaust. This will drive the cylinder rod 35 in the opposite direction (down), tending to counteract the original action by closing the four-way valve (by moving stem 29 downward). This action will continue until the comparator rod 22 stops moving, at which time the downward displacement of the cylinder rod 35 will finally close off the valve ports 46, 48, and 50 (by bringing the four-way valve to the equilibrium position illustrated in FIG. 3) from the ports of the power cylinder 36; hence, all motion would then stop.

The output displacement (of the comparator 15, appearing as a displacement of rod 22, either upwardly or downwardly) is amplified in terms of power (force) and/or displacement by the fluid servo system 24. It can be shown that the ratio of power cylinder displacement to comparator displacement is given by Y/X, wherein Y is the distance between the valve pivot 31 and the cylinder pivot 33 and X is the distance between the valve pivot 31 and the comparator pivot 26 (see FIG. 2). It can also be shown that the force amplification is given by the ratio $A_p P_p / A_c P_c$, where $A_p$ and $A_c$ are the effective areas of the power cylinder piston and the comparator capsule, respectively, and $P_p$ and $P_c$ are the differential pressures of the power cylinder and the comparator, respectively.

The flow control valves 37 and 40 are used to adjust the response and stability of the servo system 24.

According to this invention, the output power of the fluid servo system 24 is used to directly drive a final control element 52. For this purpose, the cylinder rod 35 is extended beyond the T-fitting 34 as at 35a, and this end of the rod is mechanically coupled to the final control element 52 (e.g., a valve). The said final control element directly affects the process variable of process 1. For example, it can be a flow control valve for controlling the flowrate of a stream, or a throttling valve for controlling the speed of a steam turbine.

Summarizing the overall operation of the controller of this invention, the power cylinder displacement output is made to drive the final control element 52. In the case of flowrate control of a stream, suppose again that the command signal (corresponding to a setpoint) is increased by a certain amount. The comparator rod 22 will move up and the cylinder rod 35 will move down accordingly, as explained hereinabove. This movement of the cylinder rod will open the control valve (which latter is, in this case, the final control element 52) further, to increase the flowrate, until the output of the flowrate detector (which in this case is detector 3, FIG. 1) equals the command signal, at which time the comparator rod 22 will stop and the cylinder rod 35 will accordingly stop driving the control valve. The flowrate will then be maintained at the new command setting (setpoint).

Figure 4:
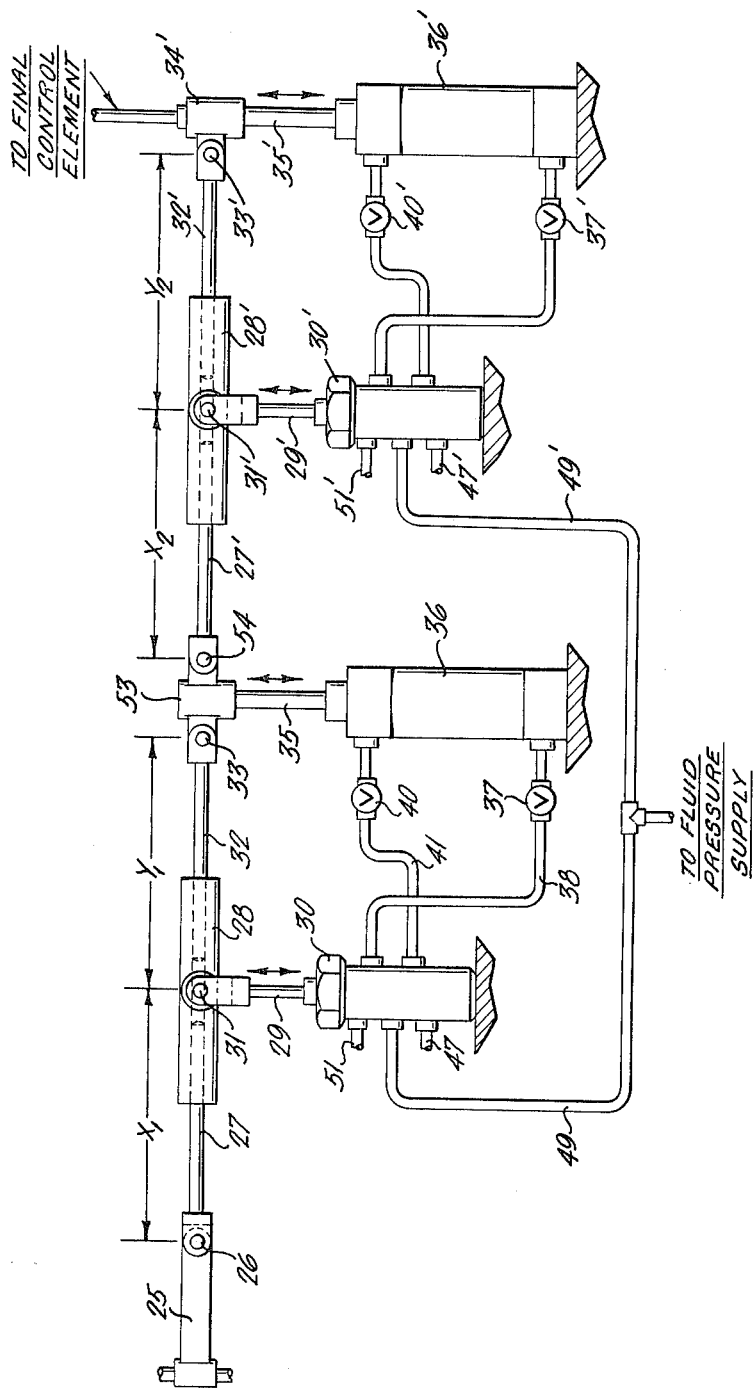
FIG. 4 is a schematic similar generally to FIG. 2, but showing a modification.

Additional amplification can be realized by adding more fluid servo stages. Refer now to FIG. 4, which illustrates a two-stage servo system. In this figure, parts the same as those previously described are denoted by the same reference numerals, while similar parts are denoted by the same reference numerals, but carrying prime designations. In FIG. 4, one end of the link member 32 is slidably mounted in sleeve 28 (opposite to link 27), and the other end of member 32 is pivotally connected at 33 to one side of a cross fitting (four-way fitting) 53 which is secured to the rod 35 of the double-acting cylinder 36 (which serves as a buffer cylinder).

One end of a link member 27' is pivotally connected at 54 to the fitting 53, opposite pivot 33, and the other end of member 27' is slidably mounted in one end of a sleeve 28'. The stem 29' of a four-way valve 30' (preferably exactly similar in construction to valve 30, and similarly connected to the fluid pressure supply and to exhaust, and to a double-acting cylinder 36' serving as an output cylinder) is pivotally connected at 31' to the central portion of sleeve 28'. One end of a link member 32' is slidably mounted in the other end of sleeve 28' (opposite to link 27'), and the other end of link member 32' is pivotally connected at 33' to the T-shaped fitting 34' which is secured to the rod 35' of cylinder 36'.

In FIG. 4, the items 30 and 36, and piping associated therewith, comprise a first stage; the items 30' and 36' and piping associated therewith, comprise a second stage. The input displacement to the two-stage fluid servo is provided at the comparator pivot 26, and the output power or output displacement appears at the output cylinder rod 35'. The cylinder rod 35' directly drives the final control element (which directly affects the process variable), in the FIG. 4 controller.

In FIG. 4, the displacement amplification is given by $Y_1/X_1 + Y_2/X_2$, where $Y_1$ the distance between the valve pivot 31 and the cylinder pivot 33, $X_1$ is the distance between the comparator pivot 26 and the valve pivot 31, $Y_2$ is the distance between the valve pivot 31' and the cylinder pivot 33', and $X_2$ is the distance between the valve pivot 31' and the (buffer) cylinder pivot 54. The force amplification in FIG. 4 is given by the ratio $A_{p2}P_{p2}/A_cP_c$, where $A_{p2}$ is the effective area of the power cylinder piston in the second stage cylinder 36', $A_c$ is the effective area of the comparator capsules, $P_{p2}$ is the differential pressure of the second-stage power cylinder 36', and $P_c$ is the differential pressure of the comparator.

It should be noted, however, that amplification (as in FIG. 4) is usually obtained at the expense of degradation in response, stability, and accuracy.

By way of recapitulation, the following features of the controller of this invention may be noted:

1. The controller of this invention has greater reliability than conventional controllers, by virtue of its ability to detect the process variable without mechanical interface.
2. The noncontacting detection, coupled with the fast response of the fluidic circuits 5, can reduce the response time to about one-tenth of that of the conventional pneumatic detector.
3. The fluid servo drive system 24 provides a simple and fairly direct means of power amplification. In effect, the force balanced feedback system (conventionally used, in the prior art) is completely eliminated, which would further improve reliability and system response time.

The invention claimed is:

1. A fluid control system for controlling a process variable which avoids the necessity of a direct mechanical interface with the process variable, comprising:
   a. a fluidic system means for producing process fluid pulses which are represetative of the value of a process variable;
   b. a fluidic system means for producing command fluid pulses which are representative of the value of a command signal;
   c. means for converting the process fluid pulses to process analog fluid pressures;
   d. means for converting the command pulses to command analog fluid pressures;
   e. means for comparing the analog fluid pressures of both the process and command pulses so that a differential displacement is produced;
   f. a fluid servo system to amplify said differential displacement; and
   g. final control means for varying the value of the process variable in response to the amplified differential displacement from said fluid system.

2. System recited in claim 1, further comprising fluidic circuit means to vary the width of the pulses and to amplify the pulses received from the means for producing process fluid pulses, before the pulses arrive at the converting means.

3. System recited in claim 1, wherein the converting means comprise a pressure capsule for both the process and command pulses, thereby producing an output displacement having a force proportional to the pressure experienced within the capsule.

4. System recited in claim 3, wherein the comparing means comprises means for having the output displacement of each pressure capsule directly oppose each other, thereby creating a differential displacement.

5. System recited in claim 1, wherein the fluid servo system comprises:
 a. a fluid valve having its stem arranged to be moved in response to the displacement produced by the comparing means; and
 b. a fluid power cylinder connected so that the position of its piston rod is responsive to the fluid pressure output of the fluid valve and having the piston rod linked to the stem of the fluid valve so that the stem is moved in response to a change of position of the piston rod of the first fluid power cylinder.

6. System recited in claim 1, wherein the fluid servo system comprises:
 a. a first fluid valve having its stem arranged to be moved in response to the displacement produced by the comparing means; and
 b. a first fluid power cylinder connected so that the position of its piston rod is responsive to the fluid pressure output of the fluid valve and having the piston rod linked to the stem of the fluid valve so that the stem is moved in response to a change of position of the piston rod of the first fluid power cylinder;
 c. a second fluid valve having its stem arranged to be moved in response to the displacement of the piston rod of the first fluid power cylinder; and
 d. a second fluid power cylinder connected so that the position of its piston rod is responsive to the fluid pressure output of the second fluid valve and having the piston rod linked to the stem of the second fluid valve so that said stem is moved in response to a change in position of the piston rod of the second fluid power cylinder.

* * * * *